United States Patent [19]

Tanigawa et al.

[11] 3,779,528
[45] Dec. 18, 1973

[54] GAS-LIQUID CONTACTING APPARATUS

[75] Inventors: Shogo Tanigawa; Takesi Yokoyama, both of Tamano; Kouichi Karakawa, Toyama, all of Japan

[73] Assignee: Mitsui Shipbuilding and Engineering Co. Ltd., Tokyo, Japan

[22] Filed: Aug. 24, 1971

[21] Appl. No.: 174,451

[30] Foreign Application Priority Data

Aug. 26, 1970 Japan............................45/84897
Sept. 16, 1970 Japan............................45/91872

[52] U.S. Cl. ............................... 261/114 R, 55/257
[51] Int. Cl. ............................................. B01d 3/26
[58] Field of Search ............. 55/223, 240, 255–257; 261/114 R, 113, 114 A, 114 VT, 114 JP

[56] References Cited
UNITED STATES PATENTS

| 410,634 | 9/1889 | Bolton............................. 261/114 R |
| 1,918,005 | 7/1933 | Urquhart........................ 261/114 R |
| 1,935,709 | 11/1933 | Hall ................................. 261/114 A |
| 2,522,425 | 9/1950 | Baumann et al................ 261/114 A |
| 3,125,614 | 3/1964 | Mayfield et al................. 261/114 JP |
| 3,146,280 | 8/1964 | Forgrieve....................... 261/114 JP |
| 3,633,882 | 1/1972 | Karakawa et al. .............. 261/114 R |

Primary Examiner—Tim R. Miles
Assistant Examiner—Steven H. Markowitz
Attorney—Howson & Howson

[57] ABSTRACT

A gas-liquid contacting apparatus provided with vertically spaced trays having gas flow openings therein and contacting structures provided on the trays surrounding the gas flow openings. Each contacting structure has a cover for preventing gas and liquid from ascending and a perforated plate above the liquid level on the tray and has a semi circular shape in horizontal section.

4 Claims, 7 Drawing Figures

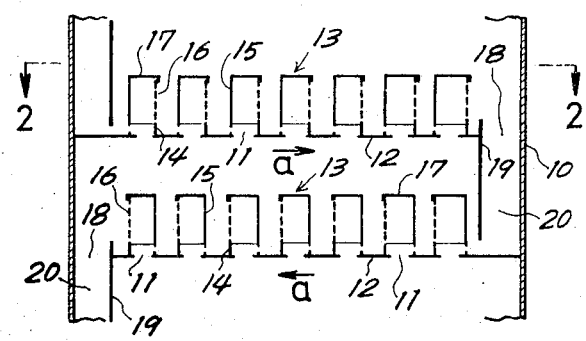
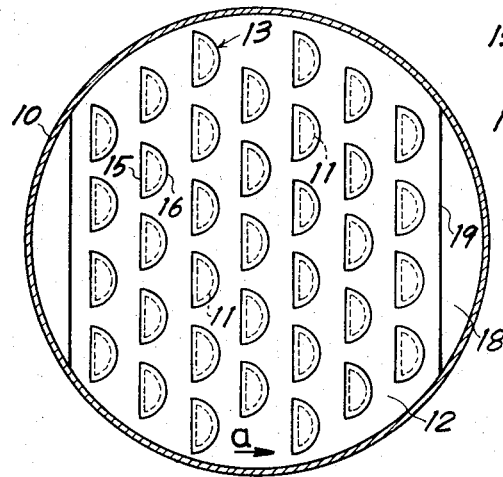

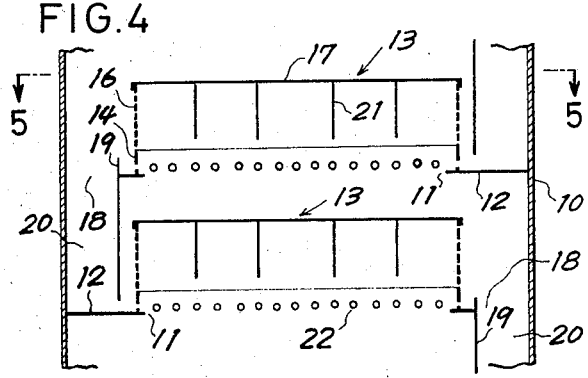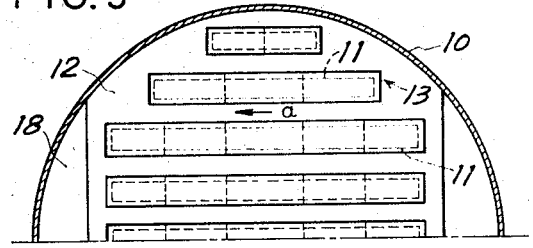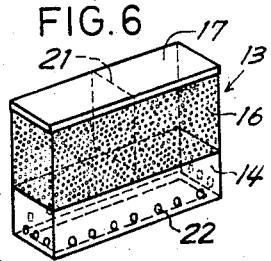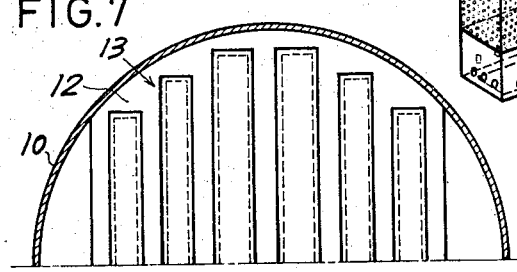

GAS-LIQUID CONTACTING APPARATUS

The present invention relates to a gas-liquid contacting apparatus for heat or mass transfer such as distillation apparatus or absorption apparatus in the chemical industry.

An object of the present invention is to provide a gas-liquid contacting apparatus which has high contacting efficiency despite being of simple construction.

To this end, the gas-liquid contacting apparatus in accordance with the present invention comprises a plurality of a gas-liquid contacting structures surrounding gas flow openings provided on the tray and each gas-liquid contacting structure has a non-circular shape in horizontal section.

In the drawings:

FIG. 1 is a vertical sectional view of the preferred embodiment of the present invention ;

FIG. 2 is a sectional view taken on line 2—2 in FIG. 1;

FIG. 3 is a perspective view of the gas-liquid contacting structure of the embodiment;

FIG. 4 is a vertical sectional view showing another apparatus;

FIG. 5 is a sectional view taken on line 5—5 in FIG. 4;

FIG. 6 is a perspective view of the gas-liquid contacting structure in FIG. 4; and FIG. 7 is a sectional view showing another apparatus Referring to the drawings and particularly to FIGS. 1 to 3, trays 12 each having a plurality of gas flow apertures 11 in semicircular shape are provided in a column 10 at a suitable vertical spacing. Each tray 12 is provided with gas-liquid contacting structures 13 surrounding each gas flow aperture 11. Each gas-liquid contacting structure has a semicircular shape in horizontal section and comprises a semi-cylindrical tubular weir wall 14 surrounding the aperture 11 and having a plurality of apertures, a vertical tubular structure having a plane portion 15 and an arcuate perforated portion 16 and a cover 17. These gas-liquid contacting structures are so arranged that a plane portion of each weir 14 faces the blow of liquid on the tray and is at right angles to the liquid flow direction shown by arrows "a." Each tray 12 is also provided with segment shaped opening 18 at a downstream end, at which weir and guide plate 19 is secured to form a downcomer 20. The plate projects upwardly from the tray to maintain liquid thereon at a predetermined depth and the lower end thereof is near the lower tray. Each succeeding downcomer is arranged in the diametrically opposite position so that the liquid flow direction alternates.

The liquid on the tray 12 overflows the weir formed by the plate 19 and flows down along the inside wall thereof. Liquid is maintained on the tray at a level determined by height of the weir plate 19, passes through the apertures of the weir 14 to the inside of each contacting structure of first array and flows toward the aperture 11 of the tray reason of the head of liquid on the tray. Liquid having passed over edge of the aperture 11 is blown up by the gas ascending through the aperture without falling down through the aperture. Thus the liquid and gas are formed into the gas-liquid mixing flow. The gas-liquid mixing flow ascends and is diverted by the cover 17. Thereby the gas-liquid mixing flow flows from the structure through the perforated plate 16 of the downstream side. Any liquid drops are separated from the gas when it passes through the apertures of the perforated plate and ascends to the apertures 11 of the upper tray. Liquid separated from the flow falls into the pool maintained on the tray, flows to the downstream as shown by the arrow "a," and enters into contacting structures of the next downstream. Thus gas-liquid contact is sequentially performed in each contacting structure. Finally the liquid on the tray flows down to the lower tray through the downcomer 20.

In accordance with the present invention, it is possible to provide a plurality of gas-liquid contacting structures on the tray comparing with the cylindrical structure, because the structure is formed in semicircular shape in horizontal section. Therefore gas-liquid contacting efficiency per one tray is increased. Further, flow direction of the gas-liquid mixing flow is smae as that of liquid on the tray, which will provide smooth operation.

The gas-liquid contacting apparatus shown in FIGS. 4 to 6 is provided with a plurality of rectangular gas flow apertures 11 in each tray. The rectangular apertures 11 are arranged parallel to and along the liquid flow direction shown by arrow "a."

The gas-liquid contacting structure 13 is of parallelpiped form and comprises a weir wall 14 surrounding the aperture 11 and having a plurality of apertures 22, a perforated plate 16, a cover 17, and partition plates 21 provided in the strucutre. Other parts thereof are identical with that of previous embodiment and duplicate reference characters being used to identify similar parts.

The gas-liquid contact is performed sequentially in each space provided by the partition plates 21. More specifically, the gas-liquid mixing flow can not flow from one space to the next downstream space owing to the partition plate. Therefore, the gas-liquid mixing flow passes through the perforated plate 16 and separated liquid drops fall on the tray. Then, the liquid flows downstream on the tray, enters into the next space of the gas-liquid contacting structure through apertures 22, and thereby the liquid contacts again with the gas.

The gas-liquid contacting structures shown in FIG. 7 are arranged at right angles to the liquid flow direction. This structure is not provided with a partition plate such as plate 21 of the above embodiment.

In accordance with this arrangement, liquid on the tray inevitably enters into the gas-liquid contacting structure so that effective contact is obtained.

From the foregoing, it will be understood that it is possible to design the gas flow openings 11 of the tray to have larger total area than that of round openings, which will provide an apparatus of small size.

What is claimed is:

1. A gas-liquid contacting apparatus comprising an upright column in which the gas flows upwardly, a series of trays mounted transversely in said column in vertically-spaced relation, means for maintaining liquid thereon at a predetermined depth including downcomer means to transfer liquid from an upper tray to the next lower tray and arranged so that the gas does not flow upwardly through said downcomer means, said downcomer means for the next lower tray being positioned at the opposite side of the column from the downcomer means for the upper tray, whereby the liquid is directed to flow across said tray from said upper cowncomer means to said next downcomer means, and a plurality of semi-circular gas-flow openings in each tray through which the gas is adapted to flow, contacting structure surrounding each of said openings comprising a semi-cylindrical tubular wall projecting upwardly from said tray and having apertures at a lower position below said predetermined depth of liquid to permit discharge of the liquid from the tray therethrough, each said wall comprising a plane portion transverse to the direction of flow across said tray and facing the flow, and an arcuate portion extending around said opening, a tubular plate disposed vertically above the predetermined depth of liquid on said tray and overlying said tubular wall and having perforations to permit gas flow therethrough, said structure being designed so that the liquid from said tray discharged through said apertures is blown up by the gas ascending through the gas-flow opening of the tray, the desired gas-liquid contact being effected within said perforated plate above said gas-flow opening, and a cover above said perforated tubular plate to prevent gas and liquid within said perforated plate from ascending.

2. A gas-liquid contacting apparatus according to claim 1 wherein said tubular plate comprises a plane portion disposed over said plane wall portion and an arcuate portion disposed over said arcuate wall portion, said plate perforations being in the arcuate portion to cause the gas to flow outwardly from said contact structure concurrently with the liquid flow on said tray.

3. A gas-liquid contacting apparatus according to claim 1 wherein said discharge apertures are confined to said plane wall portions.

4. A gas-liquid contacting apparatus according to claim 3 wherein said tubular plate is semi-cylindrical and comprises a vertical extension of said tubular wall, said perforations being confined to the arcuate portion of said plate.

* * * * *